(12) United States Patent
Chen et al.

(10) Patent No.: US 9,205,504 B2
(45) Date of Patent: Dec. 8, 2015

(54) SELF-ADJUSTING POWER DEVICE FOR HIGH EFFICIENCY ELECTRICAL DISCHARGE MACHINING AND METHOD THEREOF

(75) Inventors: Der-Shuen Chen, Taichung (TW); Chao-Chuang Mai, Taichung County (TW); Chen-Huei Kuo, Taichung County (TW); Chih-Ping Cheng, Miaoli County (TW); Chin-Hui Chen, Taichung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1076 days.

(21) Appl. No.: 13/197,940

(22) Filed: Aug. 4, 2011

(65) Prior Publication Data

US 2012/0152907 A1 Jun. 21, 2012

(30) Foreign Application Priority Data

Dec. 17, 2010 (TW) ................................ 99144567 A (51) Int. Cl.
*B23H 1/00* (2006.01)
*B23H 1/02* (2006.01)

(52) U.S. Cl.
CPC ...................................... *B23H 1/022* (2013.01)

(58) Field of Classification Search
CPC ...................................................... B23H 1/022
USPC ..................... 219/50, 68, 69.11, 69.13, 69.17
See application file for complete search history.

(56) References Cited

U.S. PATENT DOCUMENTS

| 3,206,639 | A | * | 9/1965 | Henry | ........................... | 315/289 |
| 3,778,579 | A | * | 12/1973 | Takarada | ................... | 219/69.19 |
| 3,860,779 | A | * | 1/1975 | Marendaz | ................. | 219/69.16 |
| 4,056,702 | A | * | 11/1977 | Bell et al. | ................... | 219/69.13 |

(Continued)

FOREIGN PATENT DOCUMENTS

| CN | 2194781 | 4/1995 |
| CN | 201300269 Y | 9/2009 |

(Continued)

OTHER PUBLICATIONS

China Patent Office, "Office Action", Feb. 8, 2014.

(Continued)

*Primary Examiner* — Dana Ross
*Assistant Examiner* — Joseph Iskra
(74) *Attorney, Agent, or Firm* — WPAT, PC; Justin King (57) ABSTRACT

A self-adjusting power device for high efficiency electrical discharge machining and method thereof is disclosed. A high-voltage arc unit and a low-voltage discharge unit provide a high voltage arc pulse and a low voltage discharge pulse to an electrode respectively. The electrode machines a workpiece and feeds back a gap voltage to a discharge pulse generation unit. The discharge pulse generation unit determines whether the gap voltage is lower than a predetermined voltage or not. If yes, a discharge channel between the electrode and the workpiece is conducted, and the discharge pulse generation unit shuts down the high-voltage arc unit and the low-voltage discharge unit is still operating at ON time and shuts down at OFF time. If no, looping the determination of the discharge pulse generation unit. Therefore, discharge machining energy is accurately controlled and high efficient power saving is achieved.

10 Claims, 10 Drawing Sheets

(56) References Cited

U.S. PATENT DOCUMENTS

| | | |
|---|---|---|
| 4,071,729 A | 1/1978 | Bell, Jr. |
| 4,460,815 A | 7/1984 | Bell, Jr. et al. |
| 4,710,603 A | 12/1987 | Obara |
| 5,371,334 A | 12/1994 | Otto et al. |
| 5,903,067 A * | 5/1999 | Sato et al. ............... 307/113 |
| 6,727,455 B1 | 4/2004 | Denki et al. |
| 7,709,764 B2 | 5/2010 | Denki et al. |

FOREIGN PATENT DOCUMENTS

| | | | |
|---|---|---|---|
| DE | 19802122 A1 | | 11/1998 |
| JP | 61-4620 | | 1/1986 |
| JP | 63-134115 | | 6/1988 |
| TW | 226974 | * | 7/1994 |
| TW | 521018 | | 2/2003 |
| TW | I285571 | | 8/2007 |
| TW | I290499 | | 12/2007 |
| TW | I305974 | | 2/2009 |
| TW | 201006595 | | 2/2010 |
| TW | 201025821 | | 7/2010 |

OTHER PUBLICATIONS

Taiwan Patent Office, "Office Action", Aug. 5, 2013.

Carl Michael F. Odulio, "Energy-saving Flyback Converter for EDM Applications", Nov. 21, 2005, Tecon 2005 IEEE Region 10.

Chaojiang Li., "Study of Energy-saving Pulse Power for WEDM Based on Pulse Width Modulation", Mar. 27, 2009, IEEE.

R. L. Lin, "Interleaved Four-Phase Buck-Based Current Source with Center-Tapped Energy-Recovery Scheme for Electrical Discharge Machining", May 1, 2008, IEEE APEC Twenty-Third Annual.

* cited by examiner

SELF-ADJUSTING POWER DEVICE FOR HIGH EFFICIENCY ELECTRICAL DISCHARGE MACHINING AND METHOD THEREOF

FIELD OF THE INVENTION

The present invention generally relates to discharge machining, and more particularly to a self-adjusting power device for high efficiency electrical discharge machining and method thereof.

BACKGROUND OF THE INVENTION

Figure 1:
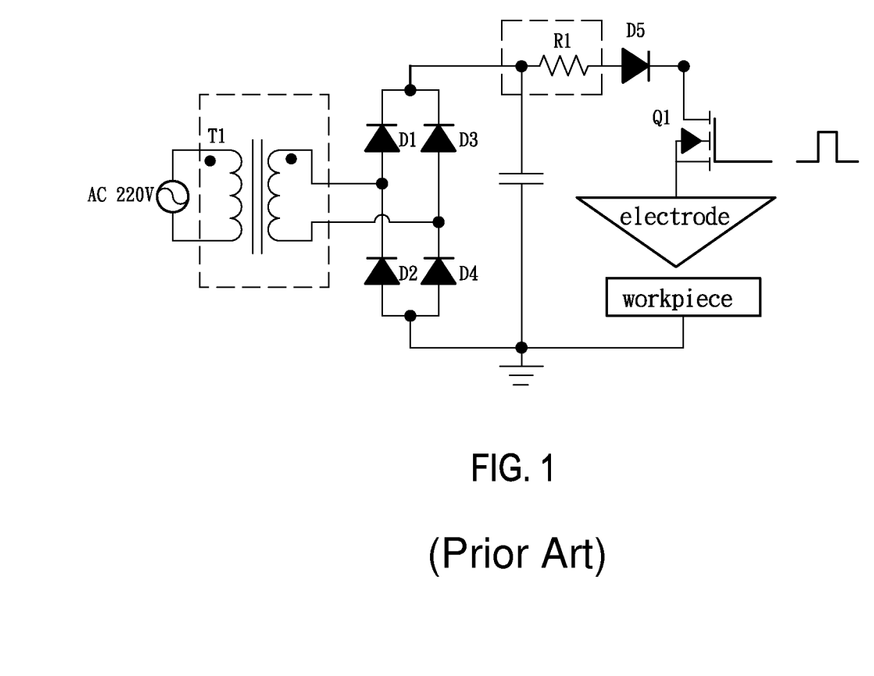
FIG. 1 shows a circuit diagram of a traditional resistant discharge machining power source.

The electrical discharge machining is using electrodes to machine a workpiece with the principle of electrical discharge and high temperature melting, wherein the discharge loop of the traditional current-limited discharge power source comprises a 220V AC power source, an AC power transformer T1, a bridge rectifier, current-limited resistance R1, a diode D5 and a transistor Q1 (shown as FIG. 1). The AC power transformer is stepping down the 220V AC-grid to AC 56-70V, and then the AC 56-70V is rectified and filtered to DC 80-100V by the bridge rectifier to limit the current with the current-limited resistance R1. In the meanwhile, a high-voltage DC power is produced between electrodes when the transistor Q1 is conducted, and a discharge current destroyed insulation is produced when the gap is reaching suitable distance and the discharge current becomes zero till the transistor Q1 is cut-off. After the cut-off time of the transistor Q1, the transistor Q1 is conducted again, and then the conducting time and cut-off time of the transistor Q1 is cycled to acquire a series of discharge currents. The disadvantage of this kind of power source is that the volume of the AC power transformer T1 is larger with higher power of the AC power transformer T1. In the aspect of loss, because the loss power of the current-limited resistance R1 is the product of the resistance and the square of the current, the loss power is extremely high and the Watt of the current-limited resistance R1 is relatively higher to result in the problems of large volume and hard cooling. The actual power used for electrical discharge machining is 30%, and the rest of power (70%) is wasted in the current-limited resistance R1 to result in low efficiency.

Please refer to TW publication patent No. 201025821, which is disclosed a green-energy power generator for electrical discharge machine. When the electrical discharge machine starts to machine, a high-voltage DC power arc is produced first, and then the output voltage (discharge voltage) of an AD adaptor is step-down to achieve the objective of power saving. However, the discharge voltage is not adjustable, so that the cutting requirement of the week conductive and variable resistance materials is not able to be resolved.

Please refer to TW publication patent No. 201006595, which is disclosed a self-tuning power control method and device for discharge machining power system. Low-voltage ignition and high-voltage discharge are used, wherein the low-voltage ignition is tunable, but the pulse width of the power source of the discharge machining is narrow and easily resulting in inefficient discharge machining.

Please refer to U.S. Pat. No. 4,071,729, which is disclosed an adaptive control system and method for electrical discharge machining. It comprises a current limiting stage for limiting the peak current provided to the gap at certain critical combinations of on-off time ratios so that possibility of gap short circuiting is substantially eliminated.

Please refer to U.S. Pat. No. 4,460,815, which is disclosed a current limit system and method for electrical discharge machining apparatus. The system operates to use the desired on-time and current values, but the off-time will be modified depending on the maximum current limit possible. This will protect the apparatus when an impossible combination has been entered by the operator. The method insures that the frequency to current limit ratio is within workable limits. The method includes a comparing the operator preset values to a predetermined value. If the operator preset period (off-time plus on-time) is greater than that value, the machining operation proceeds. If the period is less than that value, a minimum allowable period is calculated by taking the current limit number and dividing by 4 and 8. The results are added to determine the base minimum period. The desired or preset period is then subtracted from the minimum period and the difference added to the off-time. Electrical discharge machining then proceeds.

Please refer to U.S. Pat. No. 5,371,334, which is disclosed a method of electrical discharge machining control by monitoring gap resistance. A pair of electrodes are spaced from one another so as to define a gap. One of the electrodes constitutes a workpiece to be machined and the other electrode constitutes a machining tool. To machine the workpiece, groups of electrical discharges are generated between the electrodes. The different groups are separated by pauses which are free of discharges, and the electrical resistance of the electrode gap is measured during the pauses. When the resistance decreases to a critical value, the lengths of the pauses and the spacing between the electrodes are increased until the resistance begins to increase from the critical value. Electrical discharge activity is continued during this time. In the event that these measures fail to cause an increase in the resistance so that the critical value is obtained during several pauses, the electrical discharges are stopped and the machining electrode is abruptly shifted away from the workpiece electrode. The distance moved by the machining electrode is proportional to the frequency of repetition of the critical value and to the period of time for which the resistance remains at such value. The objects of the method are provided to make it possible to increase the rate of erosion during electrical discharge machining and be capable of reducing wear of the machining electrode during electrical discharge machining.

Please refer to U.S. Pat. No. 4,710,603, which is disclosed an electrical discharge machining power source. It is capable of eliminating the conventional drawback and to provide an electrical discharge machining power source which can charge a capacitor discharge circuit at a high speed, which eliminates heat dissipation and which provides high power source efficiency. Furthermore, it is capable of preventing a charging switching element from a capacitor in the capacitor discharge circuit from being damaged by a surge voltage and decreasing a stray inductance present in a power source circuit and to minimize energy loss.

SUMMARY OF THE INVENTION

An objective of this disclosure is providing a self-adjusting power device for high efficiency electrical discharge machining and method thereof, which is using two-step pulse power skill. When starting discharge, two sets signals corresponding to a high-voltage arc pulse and a low-voltage discharge pulse are active in the meantime to achieve the purpose of arc by a high voltage. While a gap voltage is lower than a predetermined voltage, the high-voltage arc pulse is closed and then a low-voltage power source processes to discharge machine to replace the function of traditional current-limited resistance, so as to achieve the objective of high efficiency and power saving. The structure introducing the high-voltage arc and the low-voltage discharge is capable of detecting the discharge voltage after arcing and adjusting the discharge voltage of the low-voltage power source to accurately control single-shot discharge machining energy.

To achieve above objective, a self-adjusting power device arranged on an electrical discharge machine is disclosed and comprises of a workpiece, disposed at a machined position; an electrode, disposed at a machining position and corresponding to the workpiece; a high-voltage arc unit, coupled one end of the electrode, and further electrically connected a high-voltage arc power module for providing a stable high-voltage DC voltage to the high-voltage arc unit, and the high-voltage arc unit used for controlling the magnitude of a high-voltage arc instant current and whether a high-voltage arc voltage is outputted or not; a low-voltage discharge unit, coupled the end of the electrode and further electrically connected an adjustable low-voltage discharge power module for providing a stable low-voltage DC current to the low-voltage discharge unit, and the magnitude of current when the electrical discharge machine is operating and an ON time and an OFF time of the electrical discharge machine controlled by the low-voltage discharge unit; and a discharge pulse generation unit, captured a gap voltage between the electrode and the workpiece to be a feedback voltage, and providing a high-voltage arc pulse to the high-voltage arc unit and a low-voltage discharge pulse to the low-voltage discharge unit, so that the discharge pulse generation unit is capable of controlling the high-voltage arc unit and the low-voltage discharge unit respectively.

Wherein the discharge pulse generation unit captures the feedback voltage and transmits the feedback voltage to the adjustable low-voltage discharge power module for adjusting the magnitude of the low-voltage DC current.

To achieve above objective, a method for high efficiency electrical discharge machining is disclosed and the steps comprises of electrically connecting a high-voltage arc unit and a low-voltage discharge unit to an electrode, wherein one end of the high-voltage arc unit away from the electrode is electrically connecting a high-voltage arc power module for providing a high-voltage DC voltage to the high-voltage arc unit, and one end of the low-voltage discharge unit away from the electrode is electrically connecting an adjustable low-voltage discharge power module for providing a low-voltage DC voltage to the low-voltage discharge unit; discharge machining a workpiece with the electrode, and feeding back a gap voltage as a feedback voltage between the electrode and the workpiece to a discharge pulse generation unit; determining if the gap voltage is less than a predetermined voltage or not with the discharge pulse generation unit; if yes, a discharge channel between the workpiece and the electrode is conducted, the discharge pulse generation unit provides a high-voltage arc pulse to the high-voltage arc unit to control the close of the high-voltage arc unit, the low-voltage discharge unit continuously operates at an ON time and then the discharge pulse generation unit provides a low-voltage pulse to the low-voltage discharge unit to control the close of the low-voltage discharge unit at an OFF time; if not, loop to the step of determining if the gap voltage is less than a predetermined voltage or not with the discharge pulse generation unit.

Wherein when the high-voltage arc unit is closed and the low-voltage discharge unit is operated at the ON time, a voltage adjusting step is processed by the adjustable low-voltage discharge power module. The voltage adjusting step comprises of comparing the present gap voltage and the last gap voltage with the discharge pulse generation unit; if the present gap voltage is higher than the last gap voltage, the discharge pulse generation unit transmits the voltage control signal which is step-up to the adjustable low-voltage discharge power module to raise a voltage outputted from the adjustable low-voltage discharge power module; if the present gap voltage is equal to the last gap voltage, the discharge pulse generation unit transmits the voltage control signal with maintenance to the adjustable low-voltage discharge power module to maintain the voltage outputted from the adjustable low-voltage discharge power module; and if the present gap voltage is lower than the last gap voltage, the discharge pulse generation unit transmits the voltage control signal which is step-down to the adjustable low-voltage discharge power module to lower a voltage outputted from the adjustable low-voltage discharge power module.

Further features and advantages of the present disclosure will become apparent to those of skill in the art in view of the detailed description of preferred embodiments which follows, when considered together with the attached drawings and claims.

BRIEF DESCRIPTION OF THE DRAWINGS

All the objects, advantages, and novel features of the disclosure will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Figure 2:
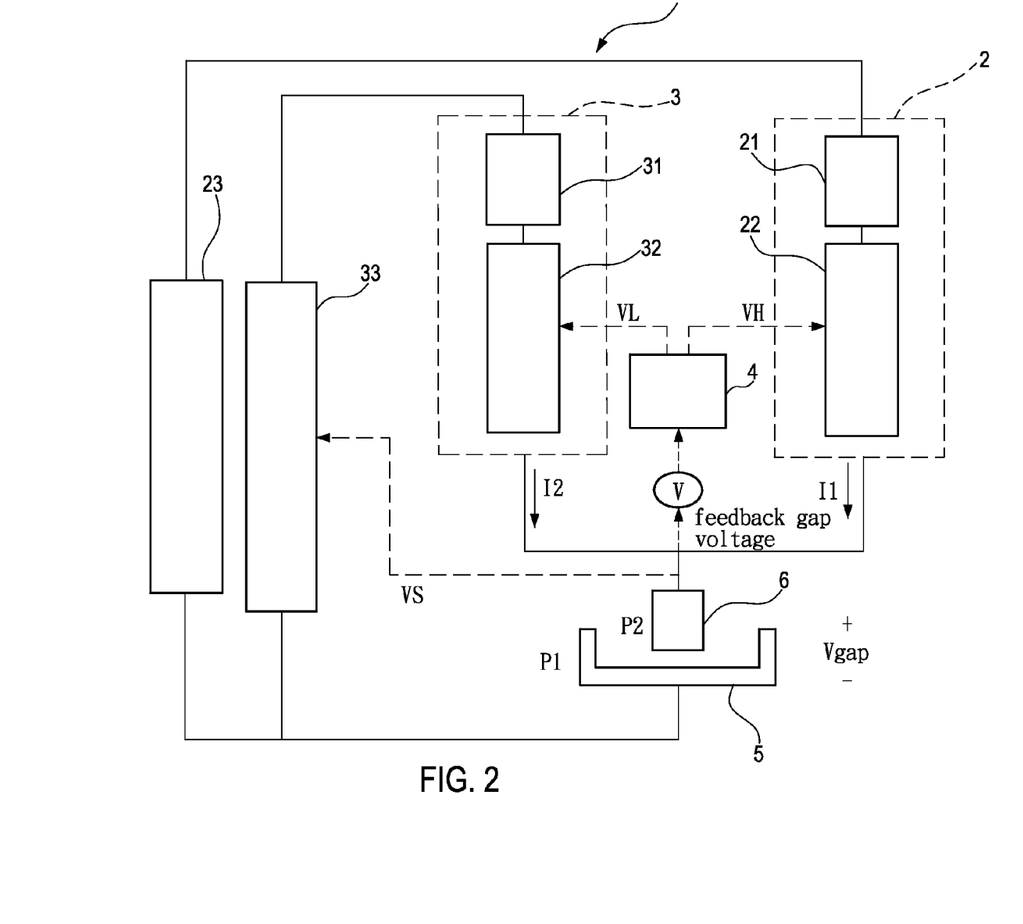
FIG. 2 shows a schematic diagram of the self-adjusting power device in accordance with the disclosure.

Please refer to FIG. 2, which shows a schematic diagram of the self-adjusting power device in accordance with the disclosure.

The self-adjusting power device 1 for high efficiency and electrical discharge machining is arranged on a electrical discharge machine (not shown), which mainly comprises a workpiece 5, an electrode 6, a high-voltage arc unit 2, a low-voltage discharge unit 3, and a discharge pulse generation unit 4.

The workpiece 5 is disposed at a machined position P1, and the electrode 6 is disposed at a machining position P2 and corresponding to the workpiece 5. A voltage is conducted to the electrode 6 to discharge machine the workpiece 5, so as to break through the insulating dielectric (not shown).

The high-voltage arc unit 2 is coupled one end of the electrode 6 and is used for controlling the magnitude of a high-voltage arc instant current and whether a high-voltage arc voltage is outputted or not. In detail, the high-voltage arc unit 2 includes a current-limited element 21 and a high-voltage arc switch module 22 that the current-limited element 21 serially electrically connects the high-voltage arc switch module 22. The current-limited element, which can be a current-limited resistance, is used for controlling the magnitude of the high-voltage arc instant current I1, and the high-voltage arc switch module 22 is used for controlling whether a high-voltage arc voltage is outputted or not.

In addition, the high-voltage 2 is coupled to the electrode 6, and further electrically connected a high-voltage power module 23. The high-voltage arc power module 23 can be a AC-DC converter and is providing a stable high-voltage DC voltage to the high-voltage arc unit 2.

When starting machining, the high-voltage arc switch module 22 is active to output a high-voltage DC power and then an arc voltage is produced from the electrode 6 to the workpiece 5. When a insulating dielectric of the workpiece 5 is broken through by the high-voltage DC power, a discharge current is instantly produced and the high-voltage arc switch module 22 is closed. Hence, the operation of the high-voltage arc unit 2 is for outputting the high-voltage DC power to the workpiece 6 and breaking through the insulating dielectric, and then instantly closing the high-voltage arc switch module 22 when the discharge current is produced.

The low-voltage discharge unit 3 electrically connects the electrode 6 and is used for controlling the magnitude of current I2 when the electrical discharge machine is operating and an ON time and an OFF time of the electrical discharge machine. In detail, the low-voltage discharge unit 3 includes a current-limited module 31 and a low-voltage discharge switch module 32 that the current-limited module 31 serially electrically connects the low-voltage discharge switch module 32, and the current-limited module 31 is used for controlling the magnitude of current I2 when the electrical discharge machine is operating and the low-voltage discharge switch module 32 is used for controlling the ON time and the OFF time of the electrical discharge machine.

In addition, the low-voltage discharge unit 3 is coupled the end of the electrode 6 and further electrically connects an adjustable low-voltage discharge power module 33. The discharge pulse generation unit 4 is capable of capturing a gap voltage Vgap between the electrode 6 and the workpiece 5 to be a feedback voltage, and then transmits a voltage control signal VS to the adjustable low-voltage discharge power module 33 based on the feedback voltage (the gap voltage Vgap), so as to adjust the magnitude of the low-voltage DC voltage outputted therefrom. The adjustable low-voltage discharge power module 33 is used for providing a stable low-voltage DC current to the low-voltage discharge unit 3.

Figure 3:
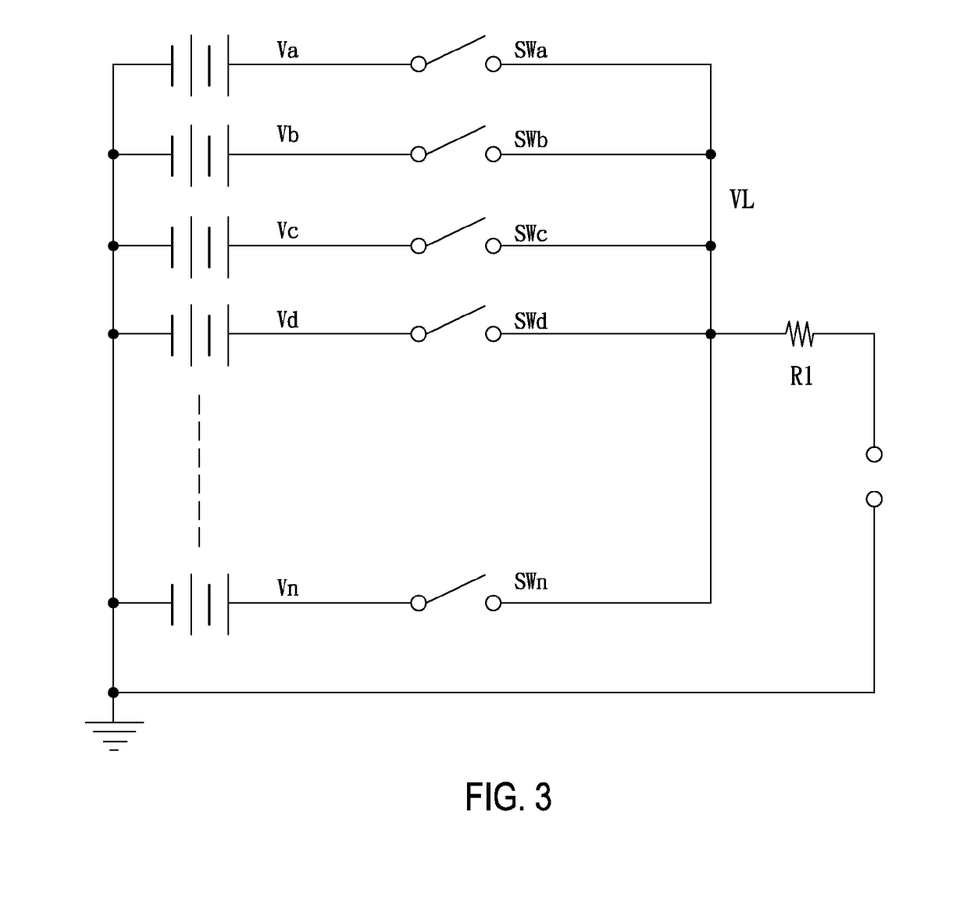
FIG. 3 shows a circuit diagram of a first preferred embodiment of an adjustable low-voltage discharge power module in accordance with the disclosure.
Figure 4:
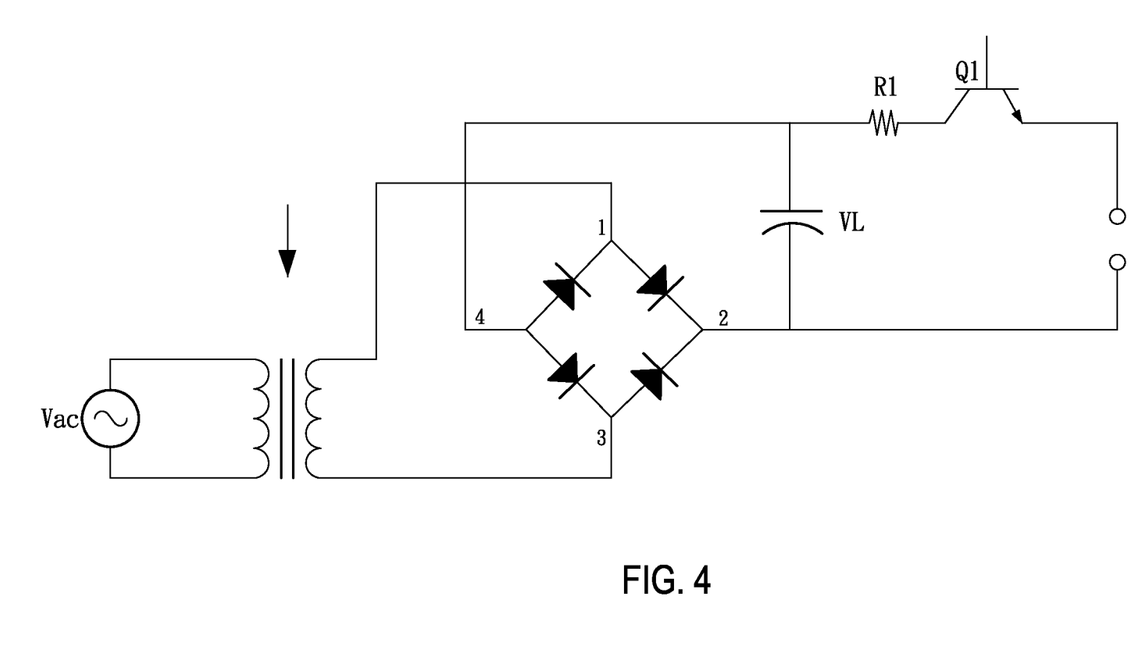
FIG. 4 shows a circuit diagram of a second preferred embodiment of an adjustable low-voltage discharge power module in accordance with the disclosure.
Figure 5:
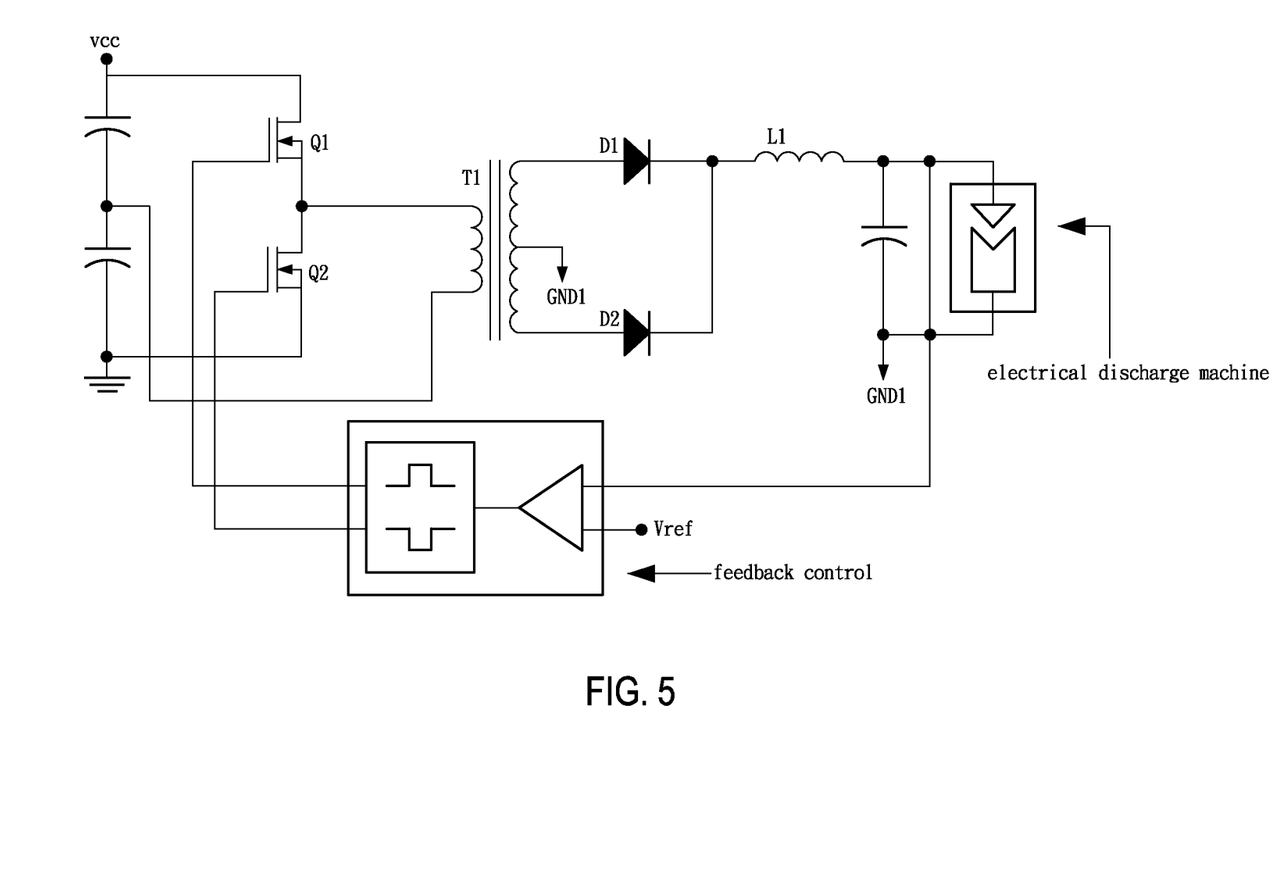
FIG. 5 shows a circuit diagram of a third preferred embodiment of an adjustable low-voltage discharge power module in accordance with the disclosure.

Please refer to FIG. 3 to FIG. 5, wherein FIG. 3 shows a circuit diagram of a first preferred embodiment of an adjustable low-voltage discharge power module in accordance with the disclosure, FIG. 4 shows a circuit diagram of a second preferred embodiment of an adjustable low-voltage discharge power module in accordance with the disclosure, and FIG. 5 shows a circuit diagram of a third preferred embodiment of an adjustable low-voltage discharge power module in accordance with the disclosure.

The adjustable low-voltage discharge power module 33 can be an AC-DC converter. The adjustable low-voltage discharge power module 33 is capable of comprising a plurality of DC power sources Va~Vn with the same or different voltages and a plurality of switch elements SWa~SWn parallel connected corresponding to the DC power sources Va~Vn (shown as FIG. 3), an adjustable transformer voltage regulator IC (shown as FIG. 4), or a switching power circuit with feedback control (shown as FIG. 5), but not be limited thereto.

The discharge pulse generation unit 4 is electrically connected the electrode 6, the high-voltage arc unit 2 and the low-voltage discharge unit 3. The discharge pulse generation unit 4 is capable of capturing the feedback voltage (the gap voltage Vgap between the workpiece 5 and the electrode 6) produced from the electrode 6, and providing a high-voltage arc pulse VH to the high-voltage arc unit 2 to control the operation of the high-voltage arc unit 2, and/or providing a low-voltage discharge pulse VL to the low-voltage discharge unit 3 to control the operation of the low-voltage discharge unit 3. The detail operations are described as below.

Figure 6:
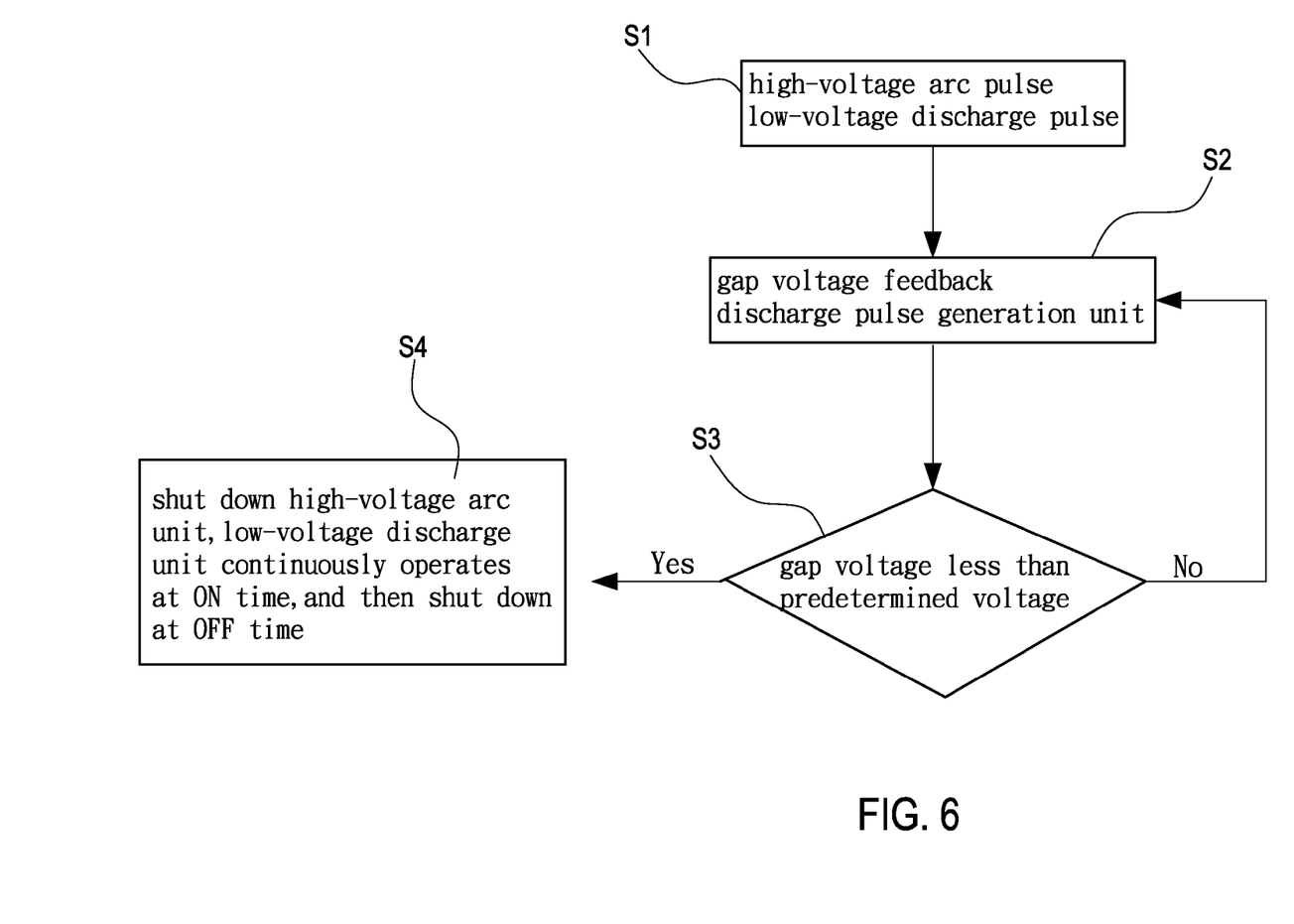
FIG. 6 shows a flow chart of a method for high efficiency electrical discharge machining in accordance with the disclosure.

Please refer to FIG. 6, which shows a flow chart of a method for high efficiency electrical discharge machining in accordance with the disclosure. The steps of the method comprise:

step S1: electrically connecting the high-voltage arc unit 2 and the low-voltage discharge unit 3 to the electrode 6, wherein one end of the high-voltage arc unit 2 away from the electrode 6 is electrically connecting the high-voltage arc power module 23 for providing the high-voltage DC voltage to the high-voltage arc unit 2, and one end of the low-voltage discharge unit 3 away from the electrode 6 is electrically connecting the adjustable low-voltage discharge power module 33 for providing the low-voltage DC voltage to the low-voltage discharge unit 3;

step S2: discharge machining the workpiece 5 with the electrode 6, and feeding back the gap voltage Vgap as the feedback voltage between the electrode 6 and the workpiece 5 to the discharge pulse generation unit 4;

step S3: determining if the gap voltage is less than a predetermined voltage or not with the discharge pulse generation unit, if not, loop to the step S2; and step S4: if yes, the discharge channel between the workpiece 5 and the electrode 6 is conducted, the discharge pulse generation unit 4 provides the high-voltage arc pulse VH to the high-voltage arc unit 2 to control the close of the high-voltage arc unit 2, the low-voltage discharge unit 3 continuously operates at the ON time and then the discharge pulse generation unit 4 provides the low-voltage pulse VL to the low-voltage discharge unit 3 to control the close of the low-voltage discharge unit 3 at the OFF time.

Wherein in step S4, the high-voltage arc pulse VH provided from the discharge pulse generation unit 4 is provided to the high-voltage arc switch module 22 of the high-voltage arc unit 2 to control the open and close of the high-voltage arc switch module 22, and further to control the high-voltage DC voltage outputted from the high-voltage arc power module 23. Simultaneously, the low-voltage discharge pulse VL provided from the discharge pulse generation unit 4 is provided to the low-voltage discharge switch module 32 of the low-voltage discharge unit 3 to control the open and close of the low-voltage discharge switch module 32, and further to control the low-voltage DC voltage outputted from the adjustable low-voltage discharge power module 33.

Figure 7:
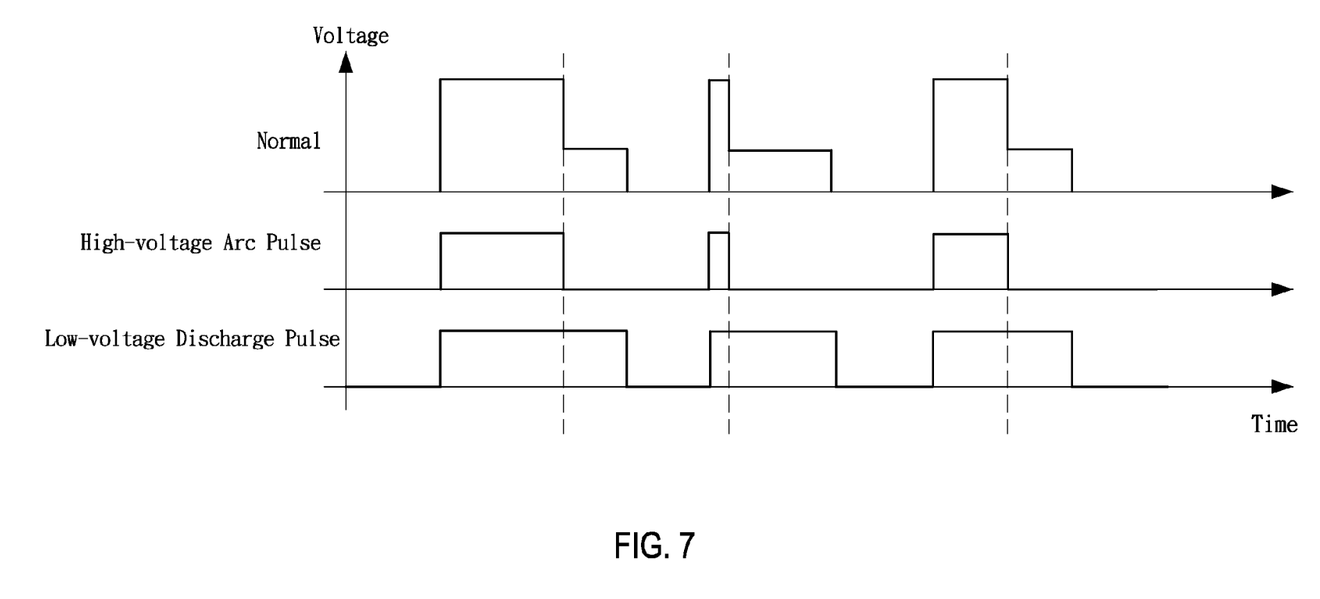
FIG. 7 shows a timing diagram of the method for high efficiency electrical discharge machining in accordance with the disclosure.

Please refer to FIG. 7, which shows a timing diagram of the method for high efficiency electrical discharge machining in accordance with the disclosure. When starting electrical discharge, two sets of pulse signals (the high-voltage arc pulse VH and the low-voltage discharge pulse VL) are active at the same time. When the gap voltage Vgap is breaking through the insulating dielectric and conducted, the gap voltage Vgap immediately lowers under 30V (the value depends on the material of the workpiece 5). Because the gap voltage Vgap is lower than the predetermined voltage (e.g. 55V) of the high-voltage arc pulse VH set by the discharge pulse generation unit 4, the discharge pulse generation unit 4 transmits high-voltage VH to the high-voltage arc switch module 22 to control the close of the high-voltage arc switch module 22 and to stop the high-voltage DC voltage of the high-voltage arc power module 23 outputting to the electrode 6. But the low-voltage discharge switch module 32 is still active to maintain the status of outputting pulse at the ON time. After the discharge channel (between workpiece 5 and electrode 6) is conducted, the discharge pulse generation unit 4 starts to count time set by the high/low of the pulse. When the ON time is ended, the OFF time is starting, and then counting is processing, the discharge pulse generation unit 4 transmits the low-voltage discharge pulse VL to the low-voltage discharge switch module 32 to control the close of the low-voltage discharge switch module 32 and to stop the low-voltage DC voltage of the adjustable low-voltage discharge power module 33 to output to the electrode 6. Meanwhile, the discharge channel is recovered to the insulating status till the end of the OFF time, and then entering the next discharge cycle.

Figure 8:
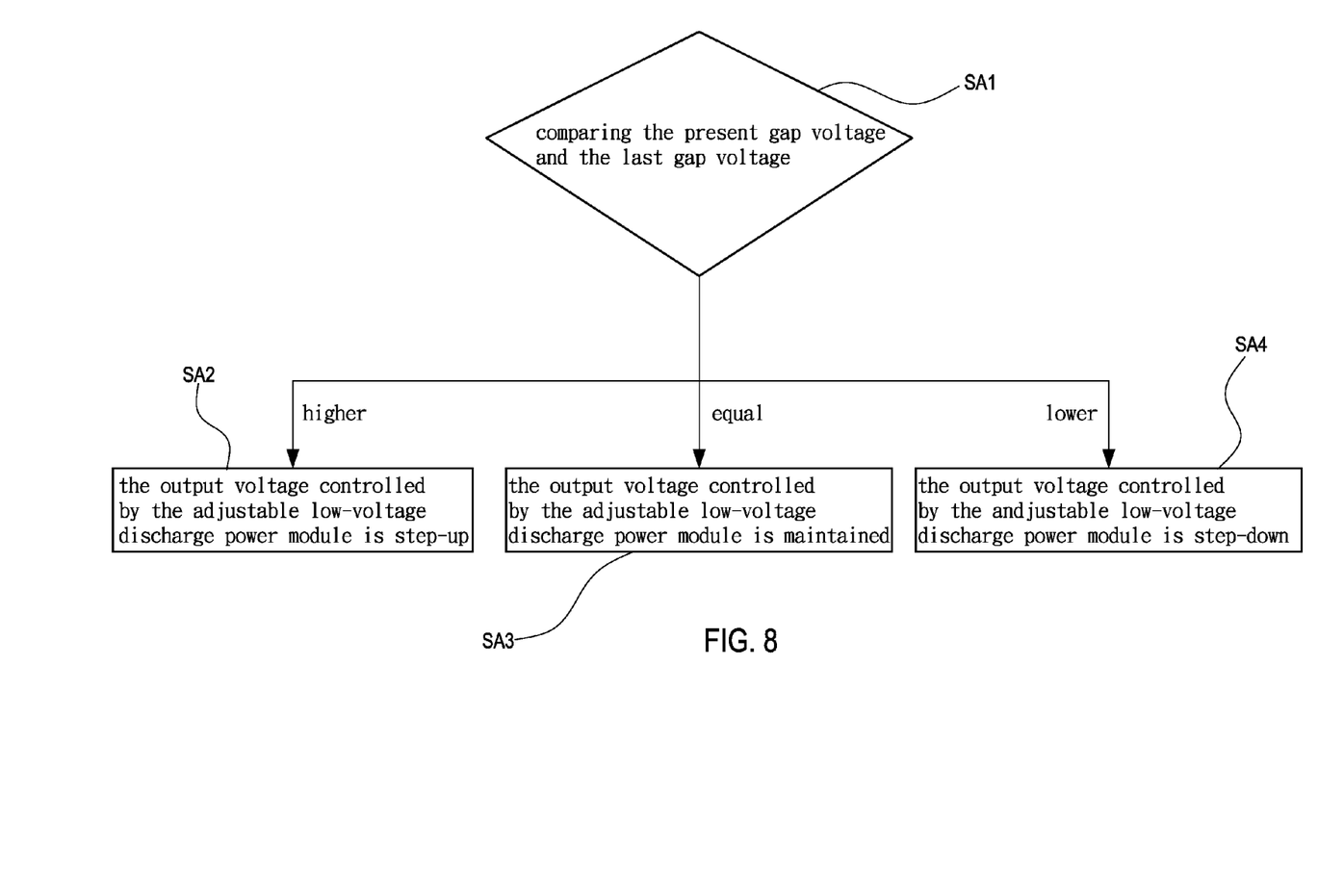
FIG. 8 shows a flow chart of a voltage adjusting step in accordance with the disclosure.

Please refer to FIG. 8, which shows a flow chart of a voltage adjusting step in accordance with the disclosure. When the high-voltage arc unit 2 is closed (that is closing the high-voltage arc switch module 22) and the low-voltage discharge unit 3 is operated at the ON time, a voltage adjusting step is processed by the adjustable low-voltage discharge power module 33. The voltage adjusting step comprises:

step SA1: comparing the present gap voltage Vgap and the last gap voltage Vgap with the discharge pulse generation unit 4;

step SA2: if the present gap voltage Vgap is higher than the last gap voltage Vgap, the discharge pulse generation unit 4 transmits the voltage control signal VS which is step-up to the adjustable low-voltage discharge power module 33 to raise a voltage outputted from the adjustable low-voltage discharge power module 33;

step SA3: if the present gap voltage Vgap is equal to the last gap voltage Vgap, the discharge pulse generation unit 4 transmits the voltage control signal VS with maintenance to the adjustable low-voltage discharge power module 33 to maintain the voltage outputted from the adjustable low-voltage discharge power module 33; and step SA4: if the present gap voltage Vgap is lower than the last gap voltage Vgap, the discharge pulse generation unit 4 transmits the voltage control signal VS which is step-down to the adjustable low-voltage discharge power module 33 to lower a voltage outputted from the adjustable low-voltage discharge power module 33.

Figure 9:
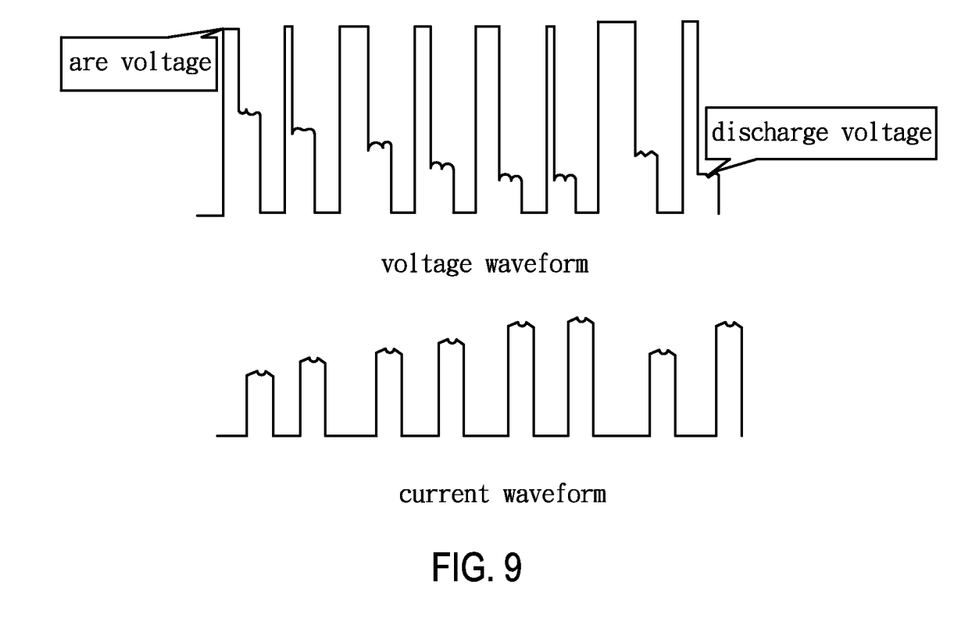
FIG. 9 shows a waveform diagram of a discharge voltage and current when discharge machining a workpiece formed by variable impedance material in accordance with the disclosure.
Figure 10:
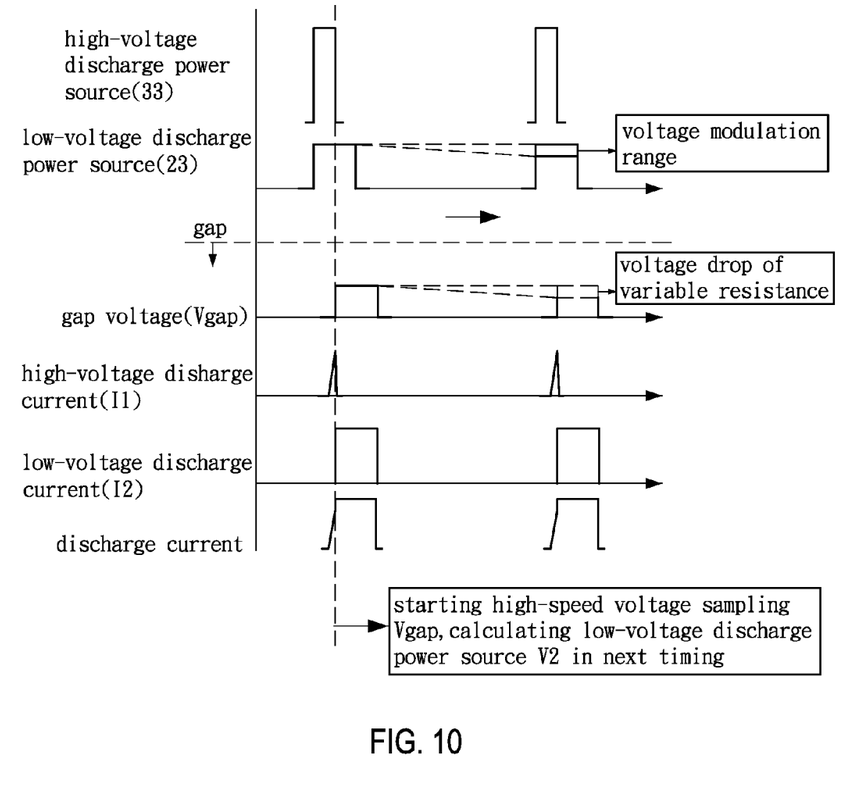
FIG. 10 shows an adjusting schematic diagram of the adjustable low-voltage discharge power module in accordance with the disclosure.

Please refer to FIGS. 9 and 10, wherein FIG. 9 shows a waveform diagram of a discharge voltage and current when discharge machining a workpiece formed by variable impedance material in accordance with the disclosure, and FIG. 10 shows an adjusting schematic diagram of the adjustable low-voltage discharge power module in accordance with the disclosure.

When processing electrical discharge machining to the workpiece 5 formed by variable resistance materials, such as PCD (Polycrystalline Diamond) or Poly-silicon, the discharge current is unstable resulting from the dynamic discharge voltage based on the machining status and resulting in bad surface quality and low machining efficiency (shown as FIG. 9). Therefore, when processing electrical discharge machining to the variable resistance materials, the real-time discharge waveform is captured by high-speed discharge voltage sampling circuit and calculated and analyzed with high speed by FPGA+DSP. The adjustable low-voltage discharge power module 33 is adjusted based on the feedback of identifying the information of the real-time discharge waveform, and then continuously the discharge energy is outputted by the adjustable low-voltage discharge power module 33 with the low-voltage discharge power source after adjusting and inputted to next discharge timing (shown as FIG. 10).

By the above structure and method, the mechanism with high-voltage arc and low-voltage discharge is capable of detecting the discharge voltage after arcing and adjusting the discharge voltage of the low-voltage power source to accurately control single-shot discharge machining energy, so as to replace the function of the traditional current-limited resistance and achieve the requirement of high efficiency power saving.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A self-adjusting power device, arranged on an electrical discharge machine, the device comprising:
   a workpiece, disposed at a machined position;
   an electrode, disposed at a machining position corresponding to the workpiece;
   a high-voltage arc unit, coupled to the electrode, and further electrically connected to a high-voltage arc power module for receiving a stable high-voltage DC voltage therefrom, wherein the high-voltage arc unit controls the magnitude of a high-voltage arc instant current and whether a high-voltage arc voltage is outputted or not;
   a low-voltage discharge unit, coupled to the electrode and further electrically connected to an adjustable low-voltage discharge power module providing a low-voltage DC voltage to the low-voltage discharge unit, wherein the magnitude of a discharge current between said electrode and said workpiece controlled by the low-voltage discharge unit; and
   a discharge pulse generation unit, capturing a real-time discharge waveform of a gap voltage between the electrode and the workpiece, and adjusting the adjustable low-voltage discharge power module based on a feedback from the real-time discharge waveform to adjust the magnitude of the low-voltage DC voltage to stabilize the discharge current.

2. The power device as claimed in claim 1, wherein the discharge pulse generation unit captures a feedback voltage and transmits the feedback voltage to the adjustable low-voltage discharge power module for adjusting the magnitude of the low-voltage DC voltage.

3. The power device as claimed in claim 1, wherein the adjustable low-voltage discharge power module is an AC-DC converter.

4. The power device as claimed in claim 1, wherein the high-voltage arc power module is a AC-DC converter.

5. The power device as claimed in claim 1, wherein the low-voltage discharge unit comprises:

a current-limited module, for controlling the magnitude of discharge current when the electrical discharge machine is operating; and a low-voltage discharge switch module, for controlling an ON time and an OFF time of the electrical discharge machine, wherein the current-limited module serially electrically connects to the low-voltage discharge switch module.

6. The power device as claimed in claim 1, wherein the high-voltage arc unit includes a current-limited element and a high-voltage arc switch module that the current-limited element serially electrically connects the high-voltage arc switch module, and the current-limited element is used for controlling the magnitude of the high-voltage arc instant current and the high-voltage arc switch module is used for controlling whether a high-voltage arc voltage is outputted or not.

7. The power device as claimed in claim 1, wherein the adjustable low-voltage discharge power module comprises a plurality of DC power sources with the same or different voltages and a plurality of switch elements parallel connected corresponding to the DC power sources.

8. The power device as claimed in claim 1, wherein the adjustable low-voltage discharge power module comprises an adjustable transformer voltage regulator IC.

9. The power device as claimed in claim 1, wherein the adjustable low-voltage discharge power module comprises a switching power circuit with feedback control.

10. The power device as claimed in claim 1, wherein the real-time discharge waveform is captured by a high-speed discharge voltage sampling circuit and calculated and analyzed with a field programmable gate array using digital signal processing.

* * * * *